US007855257B2

(12) United States Patent
Saegusa

(10) Patent No.: US 7,855,257 B2
(45) Date of Patent: Dec. 21, 2010

(54) COPOLYMER, GRAFT COPOLYMER, GRAFT COPOLYMER PARTICLES, FLAME RETARDANT, AND RESIN COMPOSITION

(75) Inventor: Kazunori Saegusa, Kobe (JP)

(73) Assignee: Kaneka Corporation, Osaka (JP)

( * ) Notice: Subject to any disclaimer, the term of this patent is extended or adjusted under 35 U.S.C. 154(b) by 834 days.

(21) Appl. No.: 11/579,926

(22) PCT Filed: May 9, 2005

(86) PCT No.: PCT/JP2005/008444

§ 371 (c)(1),
(2), (4) Date: Nov. 9, 2006

(87) PCT Pub. No.: WO2005/108450

PCT Pub. Date: Nov. 17, 2005

(65) Prior Publication Data

US 2007/0219319 A1    Sep. 20, 2007

(30) Foreign Application Priority Data

May 12, 2004  (JP)  .............................. 2004-142861

(51) Int. Cl.
*C08F 283/00* (2006.01)
*C08F 8/00* (2006.01)
*C08L 83/00* (2006.01)

(52) U.S. Cl. ........................ 525/479; 525/100; 525/106; 525/242; 525/474; 525/902

(58) Field of Classification Search .................. 525/100, 525/242, 101, 95, 98, 316, 393, 474, 479, 525/902, 106; 252/609; 523/201

See application file for complete search history.

(56) References Cited

U.S. PATENT DOCUMENTS

| 5,278,243 A | | 1/1994 | Soane | |
| 5,652,307 A | * | 7/1997 | Niessner et al. | ............. 525/101 |
| 6,071,992 A | * | 6/2000 | Okada et al. | ................. 524/139 |

FOREIGN PATENT DOCUMENTS

| DE | 198 46 205 A1 | 4/2000 |
| DE | 100 27 402 A1 | 12/2001 |
| EP | 0 261 069 A2 | 3/1988 |
| EP | 1 174 466 A1 | 1/2002 |
| JP | 2-138360 A | 5/1990 |
| JP | 7-70256 A | 3/1995 |
| JP | 7-216035 A | 8/1995 |
| JP | 7-224124 A | 8/1995 |
| JP | 2000-17136 A | 1/2000 |
| JP | 2000-226420 A | 8/2000 |
| JP | 2003-89749 A | 3/2003 |
| JP | 2003-138121 A | 5/2003 |
| JP | 2003-238639 A | 8/2003 |
| JP | 2004-346271 A | 12/2004 |

OTHER PUBLICATIONS

Shefer, A. and Gottlieb, M. Effect of cross-links on the glass transition temperature of end-linked elastomers. Macromolecules, 1992, 25, 4036-4042.*
Heller, Jorge et al., "Elastomeric Butadiene-Vinylaromatic Graft Copolymers," *Journal of Polymer Science, Polymer Letters Edition*, 1969, vol. 7, pp. 141-144.
Park, Duck-Jei et al., "Synthesis and Characterization of Acrylonitrile-EPDM-1-Vinylnaphthalene Graft Terpolymer," *Journal of Macromolecular Science, Pure and Applied Chemistry*, 1993, pp. 949-961.
Zeng, Faquan et al., "Synthesis and Characterization of Block Copolymers from 2-Vinylnaphthalene by Anionic Polymerization," *Journal of Polymer Science: Part A: Polymer Chemistry*, 2002, vol. 40, pp. 4387-4397.
Search Report and Written Opinion dated Dec. 18, 2007, in the Corresponding Singapore Patent Application No. 200607799-4, 9 pages.
Supplementary European Search Report from Application No. EP 05 73 7075, dated Aug. 7, 2008, 3 pages.
International Search Report from Corresponding International Application No. PCT/JP2005/008444, dated Aug. 16, 2005, 1 double-sided page.
PCT/IB/373 (International Preliminary Report on Patentability) from Corresponding International Application No. PCT/JP2005/008444, dated Nov. 14, 2006, 4 pages.

* cited by examiner

*Primary Examiner*—Irina S Zemel
*Assistant Examiner*—Jeffrey Lenihan
(74) *Attorney, Agent, or Firm*—Sughrue Mion, PLLC

(57) ABSTRACT

A novel copolymer, graft copolymer, copolymer particles, flame retardant, and resin composition are provided. A copolymer including a polymer (A) segment having a glass transition temperature not more than −10° C., and a polymer (C) segment having at least a unit derived from a monomer (B) which has two or more of aromatic rings and one or more radical reactive groups in one molecule; a graft copolymer having the component (B) grafted onto the component (A); and copolymer particles thereof are obtained. A flame retardant resin composition is obtained by using the copolymer as a flame retardant and blending the flame retardant with the resin.

8 Claims, No Drawings

COPOLYMER, GRAFT COPOLYMER, GRAFT COPOLYMER PARTICLES, FLAME RETARDANT, AND RESIN COMPOSITION

RELATED APPLICATIONS

This application is a nationalization of PCT application PCT/JP2005/008444 filed on May 9, 2005, claiming priority based on Japanese Application No. 2004-142861 filed on May 12, 2004, the contents of which are incorporated herein by reference in their entirety.

TECHNICAL FIELD

The present invention relates to a new copolymer. Specifically, the present invention relates to a copolymer comprising a polymer (A) segment having a glass transition temperature of not more than −10° C., and a polymer (C) segment having at least a unit derived from a monomer (B) which has two or more of aromatic rings and one or more radical reactive groups in one molecule. The present invention further relates to a flame retardant comprising the copolymer. The present invention also relates to a resin composition including the copolymer.

BACKGROUND ART

Widely used are methods for blending and finely dispersing a polymer having a low glass transition temperature in a shape of a particle in a resin constituting a matrix, such as a thermoplastic resin, a thermosetting resin, or an elastomer, in order to improve its mechanical properties, such as impact resistance and tensile properties. As examples of the polymer, polyorganosiloxanes, polyalkyl (meth)acrylates (having a low glass transition temperature), polybutadienes, etc. may be mentioned. Blending especially of the polyorganosiloxane to the matrix resin may develop various effects including improvement in low-temperature characteristics or flame retardancy by utilizing the physical characteristics, such as outstanding low-temperature characteristics, and unique reactivity of a polyorganosiloxane component.

However, since such polymers having a low glass transition temperature, especially polyorganosiloxanes, have poor compatibility with generally known resin components, and the polyorganosiloxane cannot fully develop fine dispersion or homogeneity in a shaped article obtained by being blended and kneaded with the matrix resin, there may easily occur problems, such as deterioration of appearance, and decrease in mechanical strength caused by delamination. Therefore, many investigations for overcoming the problems have been made, for example, wherein a resin component having compatibility with the matrix resin is chemically combined with the polyorganosiloxane component to form a block copolymer or a graft copolymer. Especially a graft copolymer having the above mentioned resin component grafted to a polyorganosiloxane component advantageously enables control of dispersion of the polyorganosiloxane component in the matrix resin.

A method is publicly known wherein since the polyorganosiloxane component has poor reactivity with vinyl monomers forming the resin component, a graft copolymer is efficiently formed using a polyorganosiloxane modified with a unit of so-called graft-linking agent having radical polymerization reactivity. However, left behind is a problem that in generally known graft copolymers, not all of the resin components are necessarily grafted to the polyorganosiloxane component, and a part of them exists in a separated state, and in case of a large percentage of the resin component in the separated state, for example, the polyorganosiloxane component agglomerates in the shaped article to deteriorate dispersion, failing to allow development of sufficient physical properties.

In order to overcome such a problem, for example, Patent document 1 discloses a method wherein a silane unit including methacryloyloxy-group having high reactivity with a vinyl monomer for forming the resin component is selected and the vinyl monomer is graft-polymerized to the resultant modified polyorganosiloxane component, thereby obtaining a graft copolymer having a high graft efficiency. In order to improve graft efficiency with broad options, and without limitation to specific graft-linking agents, for example, Patent document 2 discloses a graft copolymer obtained by polymerizing a monomer composed of a polyfunctional monomer represented by allyl methacrylate as main components, and furthermore polymerizing a vinyl monomer under existence of particles of (modified) polyorganosiloxane. It also shows that since this graft copolymer has a high efficiency of grafting to polyorganosiloxane particles, more polyorganosiloxane particles can be introduced into a matrix resin even with a small amount of vinyl monomer while securing dispersibility, and therefore a resin composition obtained by blending the graft copolymer into thermoplastic resins, especially polycarbonate based resins, satisfactorily develops not only impact resistance but also flame retardancy. However, further improvement will be expected in order to fulfill higher market demand nowadays requiring development of higher flame retardancy even in shaped articles having a small thickness.

Patent Document 1: JP 60-252613 A

Patent Document 1: JP 2003-238639 A

DISCLOSURE OF THE INVENTION

Problems to be Solved by the Invention

The present invention firstly aims at providing a new copolymer. An object of the present invention is to provide a copolymer that can be blended with resins such as thermoplastic resins, as a non-halogen or non-phosphorus flame retardant. Another object of the present invention is to provide a resin composition having outstanding flame retardancy and impact resistance using the copolymer.

Means for Solving the Problems

As a result of intensive investigation carried out for solving the above-mentioned problems by the present inventors, it was found out that a specific copolymer has excellent effect in improving flame retardancy and impact resistance, and blending of the copolymer to resins, such as thermoplastic resins, can provide a resin composition excellent in flame retardancy and impact resistance, leading to completion of the present invention.

That is, the present invention provides a copolymer comprising a polymer (A) segment having a glass transition temperature not more than −10° C., and a polymer (C) segment having at least a unit derived from a monomer (B) with two or more of aromatic rings and with one or more radical reactive groups in one molecule (Claim 1).

Furthermore, the present invention provides a copolymer according to Claim 1, wherein the copolymer is a graft copolymer obtained by polymerizing in one or more steps with a monomer including the monomer (B) having two or more aromatic rings and one or more radical reactive groups in one molecule in the presence of the polymer (A) having a glass transition temperature not more than −10° C. (Claim 2).

The present invention provides a copolymer according to Claim 1 or 2, wherein the polymer (A) having a glass transition temperature not more than −10° C. is a polyorganosiloxane (D) (Claim 3).

The present invention provides a copolymer according to any one of Claims 1 to 3, wherein the monomer (B) has two or more radical reactive groups per molecule (Claim 4).

The present invention provides a copolymer according to any one of Claims 1 to 4, wherein the monomer (B) has at least two aromatic rings being not in a condensed relationship and being directly bonded together (Claim 5).

The present invention provides a copolymer according to any one of Claims 1 to 5, wherein the monomer (B) is an aromatic vinyl compound (Claim 6).

The present invention provides a graft copolymer according to any one of Claims 1 to 6, wherein the copolymer is a graft copolymer obtained by further polymerizing an ethylenically unsaturated monomer (E) in one or more steps (Claim 7).

The present invention provides copolymer particles according to any one of Claims 1 to 7 (Claim 8).

The present invention provides a flame retardant comprising the copolymer or the copolymer particles according to any one of Claims 1 to 8 (Claim 9).

The present invention provides a resin composition comprising the flame retardant according to Claim 9 (Claim 10).

EFFECT OF THE INVENTION

A new copolymer of the present invention may be used as a non-halogen and non-phosphorus flame retardant having effect of improving impact resistance. Blending of the copolymer of the present invention with thermoplastic resins, thermosetting resins, and elastomers, etc. may provide a resin composition having outstanding flame retardancy and impact resistance.

BEST MODE FOR CARRYING OUT THE INVENTION

Although description of preferable embodiments of the present invention will, hereinafter, be given, the present invention is not limited to the following description.

A copolymer of the present invention comprises a polymer (A) segment having a glass transition temperature not more than −10° C., and a polymer (C) segment having at least a unit derived from monomer (B) which has two or more aromatic rings and with one or more radical reactive groups in one molecule. In order to develop flame retardancy and impact resistance of a finally obtained shaped article, a copolymer of the present invention is preferably a graft copolymer obtained by polymerizing in one or more steps a monomer including the monomer (B) having two or more aromatic rings and one or more radical reactive groups in one molecule, under existence of the polymer (A) having a glass transition temperature not more than −10° C. The copolymer of the present invention is more preferably a graft copolymer obtained by further polymerizing in one or more steps an ethylenically unsaturated monomer (E) for the same reason.

When the copolymer of the present invention is a graft copolymer, it preferably has a particulate form, and it is more preferable, but not limited, that, the polymer (A) is distributed inside the particle, and that the polymer formed from the monomer including monomer (B) and furthermore, if necessary, the polymer formed from the ethylenically unsaturated monomer (E) is distributed outside the particle.

The polymer (A) used in the present invention may be linear or branched, and also may be a cross-linked compound that is chemically or physically cross-linked.

A glass transition temperature of the polymer (A) used in the present invention is preferably not more than −35° C., more preferably not more than −60° C., and still more preferably not more than −100° C. Glass transition temperatures more than −10° C. may reduce effect improving impact resistance. The glass transition temperature used in the present invention represents a glass transition temperature reported in the 4th edition of "Polymer Handbook" published in 1999 by John Wiley & Sons. In case of copolymers, monomeric units accounting for a weight fraction of the polymer of not less than 5% are taken into account, and the glass transition temperature of a copolymer is calculated, using equation of Fox, from glass transition temperatures of homopolymers of each monomer component, and the weight fraction.

Although the polymers having a glass transition temperature not more than −10° C. are not limited, examples of the polymer include: homopolymers or copolymers of alkyl acrylates, such as ethyl acrylate, butyl acrylate, 4-hydroxybutyl acrylate, n-octyl acrylate, and 2-ethylhexyl acrylate; diene rubbers, such as polybutadienes, poly(styrene-butadiene) copolymers, and poly(norbornene-butadiene) copolymers; and polyorganosiloxanes (D), such as polydimethylsiloxanes, polymethylphenylsiloxanes, poly(dimethylsiloxane-diphenylsiloxane) copolymers, and polydimethylsiloxane having hydrogen atoms directly bonded to silicon atom, etc.

In order to give flame retardancy, polydimethylsiloxanes, polymethylphenylsiloxanes, and poly(dimethylsiloxane-diphenylsiloxane) copolymers are preferable among them, and polydimethylsiloxanes are most preferable due to economically easy availability.

When polymethylphenylsiloxanes or poly(dimethylsiloxane-diphenylsiloxane) copolymers are used, low-temperature characteristic may further be improved, and when a refractive index of a copolymer of the present invention is set close to a refractive index of the matrix resin with use of the monomer (B) and/or the ethylenically unsaturated monomer (E) as mentioned later, in combination with those siloxane copolymers, transparency may be given to the resin composition obtained. In order to satisfactorily develop impact resistance and flame retardancy, the polyorganosiloxane (D) has preferably a graft linking group, and more preferably it has at least plural graft linking groups in a side chain and/or a chain terminal, especially in a side chain, per molecule.

Methods for obtaining the polyorganosiloxanes (D) are not particularly limited, and a solution polymerization method, a suspension polymerization method, an emulsion polymerization method, etc. may be used. Preferable is a method wherein cyclic, linear, or branched organosiloxanes having a weight average molecular weight (Mw) of not more than 20,000, preferably not more than 10,000, more preferably not more than 5,000, still more preferably not more than 2,500 are polymerized using a catalyst of an acid, an alkali, an salt, etc. In this case, cyclic organosiloxanes are preferable.

More preferable examples include: a method wherein silanes having a graft linking group and/or cyclic, linear, or branched organosiloxanes with a graft linking group, having a similar weight average molecular weight (Mw) are used together with the organosiloxane in the above mentioned method; a method wherein silanes having a graft linking group and/or cyclic, linear, or branched organosiloxanes with a graft linking group, having the similar weight average molecular weight (Mw) are used without the organosiloxane in the above mentioned method; also a method wherein preferably in a solution, a slurry, or an emulsion, polyorganosiloxanes having a weight average molecular weight (Mw) of not less than 20,000, preferably not less than 50,000, still more preferably not less than 100,000, silanes preferably having a graft-linking group and/or cyclic, linear, or branched organosiloxanes having a graft linking group are equilibrated under existence of the same catalyst mentioned above, etc.; and also a method wherein preferably in a solution, a slurry, or an emulsion, polyorganosiloxanes having preferably a weight average molecular weight (Mw) of not less than 20,000, and also preferably polyorganosiloxanes having a weight average molecular weight (Mw) of not less than 20,000 and having a graft linking group are equilibrated under existence of the same catalyst mentioned above, etc.

Since dispersion of the copolymer in a matrix resin may be easily controlled, and as a result physical properties of a final shaped article may be easily controlled, the polymer (A) may be manufactured by an emulsion polymerization method. In case of using the polyorganosiloxane (D) as a preferable embodiment, the polymer (A) may be manufactured by the emulsion polymerization method from the above-mentioned organosiloxanes. In this case, under existence of the obtained emulsion, subsequently the monomer including the monomer (B) and furthermore, if necessary, the ethylenically unsaturated monomer (E), may be polymerized. Instead of the emulsion polymerization method, an emulsion of the polyorganosiloxane (D) is obtained by modifying the polyorganosiloxane in an emulsion as mentioned above, or by a method of mechanically forcibly emulsifying the polyorganosiloxane (D) obtained by the solution polymerization method, etc., using a high pressure homogenizer, etc. and subsequently, a monomer including the monomer (B) and, if necessary, furthermore ethylenically unsaturated monomer (E), may also be polymerized.

The polyorganosiloxane (D) in an emulsion state may be obtained by publicly known emulsion polymerization methods described in detail in JP 2000-226420 A, JP 2000-834392 A, U.S. Pat. No. 2,891,920, U.S. Pat. No. 3,294,725, etc.

The polyorganosiloxane (D) in an emulsion state may be obtained as follows. Emulsified are a cyclic siloxane represented by 1,3,5,7-octamethylcyclotetrasiloxane (D4), and/or a bifunctional silane having a hydrolyzable group, such as dimethyldimethoxysilane, and, if necessary, an alkoxy silane or a condensation product thereof with functionality of not less than two, such as methyltriethoxysilane and tetrapropyloxysilane, and, furthermore if necessary, a graft-linking agent such as mercaptopropyldimethoxymethylsilane, mercaptopropyltrimethoxysilane, methacryloyloxypropyldimethoxymethylsilane, methacryloyloxypropyltrimethoxysilane, vinyldimethoxymethylsilane, vinylphenyldimethoxymethylsilane, and vinylphenyltrimethoxysilane, preferably using a homogenizer etc. with water and a surfactant. In this case, emulsification and dispersion may be mechanically performed under high pressure, if necessary. Subsequently, pH is adjusted at not more than 4, preferably not more than 3, and more preferably not more than 2 by addition of an acid, or alternatively pH is adjusted at not less than 8, more preferably not less than 9.5, and more preferably not less than 11 by addition of a base. And the polymerization temperature is set at not less than 0° C., preferably not less than 30° C., more preferably not less than 50° C., still more preferably not less than 60° C., and not more than 150° C., preferably not more than 120° C., more preferably not more than 95° C. Hydrolysis and condensation reaction are performed preferably under an inert gas atmosphere, such as nitrogen, or in a vacuum and degassed state.

Here, in polymerization of the cyclic siloxanes and/or silanes, etc., may be adopted a method of using, as seed particles, organic polymers as described in JP 63-202630 A, JP 63-202631 A, and JP 4-258636 A, and a method of using a polyorganosiloxane latex as a seed latex as described in JP 60-088040 A. Preferably, as described in WO 03/068835, may be adopted a method of using, as seed particles, an organic polymer having swelling property to cyclic siloxanes, or a method of using, as seed particles, a polymer having a latex particle diameter of not more than 20 nm, preferably not more than 15 nm, and more preferably not more than 10 nm.

Emulsions of the polyorganosiloxane (D) by the above-mentioned method include volatile low molecular weight cyclic siloxanes. In order to remove the volatile low molecular weight cyclic siloxanes, may be adopted a steam stripping method as described in U.S. Pat. No. 4,600,436 and JP 2002-249582 A, or a method of making the low molecular weight cyclic siloxane to be absorbed by adding an adsorbent, such as diatomaceous earth, and then to be filtrated off as described in JP 2002-121284 A.

As another method of obtaining the polyorganosiloxane (D) in an emulsion state, methods described in JP 11-222554 A, JP 2001-288269 A, etc. may be adopted.

For example, there may be used linear or branched (modified) (poly)organosiloxanes having: a volatile low molecular weight siloxane content of not more than 5%, preferably not more than 1%; a weight average molecular weight (Mw) of not more than 20,000, preferably not more than 10,000, more preferably not more than 5,000, and still more preferably not more than 2,500; and hydroxyl group, amino group, or hydrolyzable group such as alkoxyl group or acyloxy group in their ends. If necessary, the organosiloxanes may partially be substituted by a radical reactive group, such as mercaptopropyl group, methacryloyloxypropyl group, acryloyloxypropyl group, vinyl group, vinylphenyl group, or allyl group.

The polyorganosiloxane (D) may be obtained by using the organosiloxane, if necessary, with a graft-linking agent, such as silanes having the similar radical reactive group as mentioned above, and adding water, a surfactant, etc. In this case, for example, the resultant mixture undergoes mechanically forced emulsification with a high pressure homogenizer, etc., in order to obtain a desired particle size. The polymerization temperature is set at not less than 0° C., preferably not less than 15° C., more preferably not less than 25° C., and not more than 100° C., preferably not more than 70° C., more preferably not more than 50° C. Furthermore, pH is set to the same range using an acid or a base as mentioned above. When using (poly)organosiloxanes having a small content of volatile low molecular weight siloxanes as a raw material, selection of polymerization conditions may give the polyorganosiloxane (D) having a reduced amount of the volatile low molecular weight siloxane.

In the case of using an acidic polymerization condition in polymerization of cyclic siloxanes and/or silanes, etc., or forced emulsion polymerization of (modified) (poly)organosiloxanes, surface activity of surfactants must be exhibited also under acidic conditions. For example, anionic surfactants, such as metal salts of alkyl sulfate, metal salts of alkyl sulfonic acid, and metal salts of alkylaryl sulfonic acid, may preferably be used. As the metal salts, alkali metal salts especially sodium salts, and potassium salts may preferably selected.

Sodium dodecylbenzenesulfonate is most preferable. Moreover, there may be used nonionic surfactants such as: polyoxyalkylene alkyl ethers represented by polyoxyethylene dodecyl ether; polyoxyalkylene alkylaryl ethers represented by polyoxyethylene nonylphenyl ether; polyoxyalkylene higher fatty acid esters represented by polyoxyethylene stearate; and nonionic surfactants, such as sorbitan monolauric acid ester. Alternatively, these may also be used together with the above-mentioned anionic surfactants.

As acids for adjusting the system in an acidic condition, inorganic acids, such as sulfuric acid, hydrochloric acid, and nitric acid, may be used, and organic acids, such as dodecylbenzenesulfonic acid, dodecyl sulfuric acid, and trifluoroacetic acid, may also be used. Since alkylarylsulfonic acids represented by dodecylbenzenesulfonic acid have a function not only as an acid component but also as a surfactant, even independent single use thereof may exhibit enough effect in some cases, and therefore it may preferably used. However, surfactants and acids are not limited to the above-mentioned examples, and they may be used alone or two or more kinds may be used in combination.

After polymerization under acidic condition is completed and, if necessary, after aging the obtained latex at approximate room temperatures for not less than several hours to make the molecular weight of the polyorganosiloxane into more higher one, the system is neutralized to pH of 5 to 8 by adding an inorganic base, such as sodium hydroxide, potassium hydroxide, sodium carbonate, or ammonia, or an organic base, such as alkylamine or alkylammonium hydroxide, thereby terminating polymerization of the siloxane.

Similarly, in the case of using a basic polymerization condition, surfactants maintaining surface activity also under basic conditions are preferably used. Examples are cationic surfactants including: alkyltrimethylammonium salts, such as dodecyltrimethylammonium bromide and stearyltrimethylammonium bromide, and dialkyldimethylammonium salts, such as didodecyldimethylammonium bromide. Furthermore, the above-mentioned nonionic surfactants may also be used alone, or may be used in combination with above-mentioned cationic surfactant.

As bases for adjusting the system into a basic condition, inorganic bases, such as lithium hydroxide, potassium hydroxide, sodium hydroxide, and cesium hydroxide, and organic bases, such as alkylammonium hydroxide may be used. Tetra-organoammonium hydroxides, such as cetyltrimethylammonium hydroxide described in JP 2001-106787 A have both of functions of a cationic surfactant and a base, and therefore even single use thereof may exhibit enough effect in some cases, and therefore they may preferably used. However, bases and surfactants are not limited to the above-mentioned examples, and they may be used alone or two or more kinds may be used in combination. After termination of polymerization under basic conditions, the system is aged, if necessary, and the system is neutralized in the same manner as mentioned above by adding an inorganic acid such as sulfuric acid, or an organic acid such as acetic acid or dodecylbenzenesulfonic acid, thereby terminating polymerization of the siloxane.

A weight average particle diameter of the polyorganosiloxane (D) in an emulsion state is preferably 0.008 to 0.6 μm, and more preferably 0.01 to 0.35 μm. In many cases, it is difficult to stably obtain the polyorganosiloxane (D) with a weight average particle diameter less than 0.008 μm, and the polyorganosiloxane (D) with a weight average particle diameter more than 0.6 μm has a possibility of deteriorating flame retardancy and impact resistance of the final shaped articles. In the present invention, a weight average particle diameter may be replaced by a volume average particle diameter.

The monomer (B) which is a characteristic element in the present invention is used in order to improve flame retardancy and appearance of finally acquired shaped article. And publicly known polymers in which the ethylenically unsaturated monomer (E) is directly graft-polymerized to the polymer (A), especially the polyorganosiloxane (D), may not be able to give the final shaped article sufficient flame retardancy and appearance.

The monomer (B) used in the present invention is characterized by having two or more aromatic rings and one or more radical reactive groups in one molecule. Such compounds, for example, include compounds obtained by substituting naphthalenes, biphenyls, terphenyls, quarterphenyls, phenylnaphthalenes, anthracenes, pyrenes, or perylenes with one or more vinyl groups, etc., such as 1,1'-diphenylethylene, acenaphthylene and vinylbiphenyl. Compounds further substituted by alkyl groups, such as methylvinyl biphenyl and ethylvinylbiphenyl, etc., may also be used.

In order to obtain higher effect improving flame retardancy, it is preferable that the monomer (B) is a compound having two or more radical reactive groups per molecule. Examples of such compounds include compounds obtained by substituting naphthalenes, biphenyls, terphenyls, quarterphenyls, phenylnaphthalenes, anthracenes, pyrenes, or perylenes with two or more vinyl groups, etc. For the same reason, the monomer (B) preferably has at least two aromatic rings being not in a condensed relationship and being directly bonded together. Examples of such compounds include compounds obtained by substituting biphenyls, terphenyls, quarterphenyls, phenylnaphthalenes with one or more vinyl groups, etc.

Here, the above-mentioned expression referred to as "having at least two aromatic rings being not in condensed relationship" means that the monomer (B) has two or more aromatic rings, provided that the existence of a condensed aromatic ring is allowed, and that a condensed aromatic ring is deemed as one aromatic ring, and that the number of aromatic rings is counted in such a manner. And furthermore, the above-mentioned expression referred to as "directly bonded together" means that provided that a condensed aromatic ring is deemed as one aromatic ring, the respective aromatic rings are directly bonded together.

For the same reason, the monomer (B) is preferably an aromatic vinyl compound. As such compounds, the above-mentioned compounds may be mentioned. Preferable compounds include 2,2'-divinylbiphenyl, 2,4'-divinylbiphenyl, 3,3'-divinylbiphenyl, 4,4'-divinylbiphenyl, 2,4'-di(2-propenyl)biphenyl, 4,4'-di(2-propenyl)biphenyl, 2,2'-divinyl-4-ethyl-4'-propylbiphenyl, and 3,5,4'-trivinylbiphenyl, and 3,3'-divinylbiphenyl is especially preferable among them.

In addition to the same compounds as the ethylenically unsaturated monomers (E) mentioned later, monomers which are usable with the monomer (B) include polyfunctional monomers, such as divinylbenzene, diisopropenylbenzene, allyl (meth)acrylate, triallyl cyanurate, diallyl isocyanurate, diallyl-n-propyl isocyanurate, triallyl isocyanurate, trimethallyl isocyanurate, tri(meth)acryloyl hexahydrotriazine, triallylbenzene tricarboxylate, diallyl phthalate, ethyleneglycol dimethacrylate, 1,3-butyleneglycol dimethacrylate, etc.

A monomer component including the monomer (B) is composed of 100 to 30% by weight, more preferably 100 to 50% by weight, more preferably 100 to 80% by weight, of the monomer (B) and furthermore 0 to 70% by weight, more preferably 0 to 50% by weight, more preferably 0 to 20% by weight, of other copolymerizable monomer. Most preferably the monomer (B) is used alone. Both of excessively small amount of the monomer (B), and excessively large amount of the copolymerizable monomer tend to deteriorate flame retardancy of the finally obtained copolymer.

Preferably, the polymer (C) may be obtained by publicly known radical polymerization etc. of the monomer component including the monomer (B). When the monomer component including the monomer (B) is polymerized under existence of the polymer (A) in an emulsion state by a emulsion polymerization method, publicly known initiators, that is, 2,2'-azobisisobutyronitrile, hydrogen peroxide, potassium persulfate, ammonium persulfate, etc. may be used as pyrolytic initiators. And in addition to the above-mentioned examples, a peroxide, for example, an organic peroxide, such as t-butyl-peroxy-isopropylcarbonate, paramenthane hydroperoxide, cumene hydroperoxide, dicumyl peroxide, t-butyl hydroperoxide, di-t-butyl peroxide, or t-hexyl peroxide; an inorganic peroxide, such as hydrogen peroxide, potassium persulfate, or ammonium persulfate, may be used together with, if necessary, a reducing agent, such as sodium formaldehyde sulfoxylate, or glucose; and if necessary, a transition metal salt, such as iron(II) sulfate, and furthermore if necessary, a chelating agent, such as disodium ethylenediaminetetraacetate, etc., as a redox type initiator.

Use of redox type initiators permits polymerization even at low temperatures which cause substantially no pyrolysis of the peroxides, desirably enabling setting of polymerization temperatures in a wide range.

Peroxides including aromatic rings, such as cumene hydroperoxide and dicumyl peroxide, may especially preferably be used as redox type initiators. The amount of the initiator used, and the amount used of the reducing agent, transition metal salt, chelating agent, etc., are in a publicly known range in case of using the redox type initiators.

In polymerization of the monomer component including the monomer (B), publicly known chain transfer agents may also be used and the amount thereof is also in a publicly known range. Conditions for polymerization used herein, such as polymerization temperatures, pressures, and deoxidation, are in a range known by those skilled in the art. Polymerization of the monomer component including the monomer (B) may also be performed in one or more steps.

When the copolymer of the present invention is a graft polymer, an ethylenically unsaturated monomer (E) may further be graft-polymerized. In this case, polymers formed from the monomer (E) is a component used in order to secure compatibility between a graft copolymer formed from the polymer (A) and the monomer component including the monomer (B), and a matrix resin, and to make the graft copolymer uniformly disperse in the matrix resin.

Specific examples of the monomers include aromatic vinyl monomers, such as styrene and α-methyl styrene, vinyl cyanide monomers, such as acrylonitrile, alkyl (meth)acrylates, such as methyl acrylate, ethyl acrylate, butyl acrylate, octyl acrylate, 2-ethylhexyl acrylate, lauryl acrylate, stearyl acrylate, methyl methacrylate, ethyl methacrylate, butyl methacrylate, octyl methacrylate, lauryl methacrylate, myristyl methacrylate, stearyl methacrylate, and behenyl methacrylate. These may be used alone and two or more kinds may be used in combination.

If necessary, there may be used in combination vinyl monomers including functional groups, such as vinyl monomers including carboxyl groups, such as itaconic acid, (meth) acrylic acid, fumaric acid, and maleic acid; vinyl monomers including epoxy groups, such as glycidyl methacrylate; and vinyl monomers including hydroxyl groups, such as 2-hydroxyethyl methacrylate and 4-hydroxybutyl acrylate.

As initiators, chain transfer agents, other polymerization conditions, etc. used for polymerization of the ethylenically unsaturated monomer (E), the same conditions as described for polymerization of the monomer component including the above-mentioned monomer (B) may be used. Furthermore, polymerization of the ethylenically unsaturated monomer (E) may be performed in one or more steps.

The polymer (A) in the present invention is used in an amount of preferably not less than 30 parts by weight, preferably not less than 50 parts by weight, and more preferably not less than 70 parts by weight, and in an amount of preferably not more than 95 parts by weight, preferably not more than 90 parts by weight, and more preferably not more than 80 parts by weight.

The monomer component including the monomer (B) is used in an amount of preferably not less than 0.1 part by weight, preferably not less than 0.5 part by weight, and more preferably not less than 1 part by weight, and in an amount of preferably not more than 50 parts by weight, preferably not more than 20 parts by weight, more preferably not more than 10 parts by weight, and especially preferably not more than 5 parts by weight. The ethylenically unsaturated monomer (E) is used in an amount of not less than 0 part by weight, preferably not less than 4.9 parts by weight, more preferably not less than 9.9 parts by weight, and still more preferably not less than 19.9 parts by weight, and in an amount of preferably not more than 69.9 parts by weight, preferably not more than 49.9 parts by weight, more preferably not more than 35 parts by weight, and still more preferably not more than 25 parts by weight.

The polymer (A), the monomer component including the monomer (B), and the ethylenically unsaturated monomer (E) are used so as to give 100 parts in total. Amounts of the polymer (A) and the monomer (B) are firstly determined, and subsequently, preferably an amount of the ethylenically unsaturated monomer (E) is determined so that the sum of the amount of the polymers (A) and (B) and a remaining portion may give a total of 100 parts by weight.

Use of the polymer (A), the monomer component including the monomer (B), and the ethylenically unsaturated monomer (E) outside the above described ranges makes occasionally difficult simultaneous exhibition of flame retardancy and impact resistance.

In order to control morphology of the copolymer and to allow the copolymer to realize excellent mechanical properties represented by especially impact resistance when dispersed in the matrix resin, the copolymer of the present invention is preferably in the form of particles, more preferably in the form of particles of the above-mentioned graft copolymer, especially preferably in the form of graft copolymer particles manufactured by the emulsion polymerization method as mentioned above. The weight average particle diameter thereof is preferably not less than 0.008 μm, more preferably not less than 0.01 μm, still more preferably not less than 0.05 μm, and furthermore it is preferably not more than 1 μm, more preferably not more than 0.7 μm, more preferably 0.38 μm. In many cases, it is difficult to obtain stably particles with a weight average particle diameters less than 0.008 μm, and particles with a weight average particle diameter more than 1 μm have a possibility of deteriorating flame retardancy and impact resistance of the final shaped articles.

When a copolymer of the present invention is obtained by the emulsion polymerization in this way, the emulsion can be coagulated by addition of a metal salt having not less than bivalence, such as calcium chloride, magnesium chloride, magnesium sulfate, or aluminum chloride, into the emulsion, and subsequently the copolymer of the present invention may be separated from the aqueous medium by heat-treating, dehydrating, washing and drying, (coagulating method). In view of economically inexpensive availability, and furthermore of easy handling, as metal salts having not less than bivalence, halide salts of alkaline earth metal represented by calcium chloride and magnesium chloride may preferably be used. When environmental concerns require halogen free materials, magnesium sulfate may suitably be used.

Alternatively the copolymer is precipitated by addition, to the emulsion, of a water soluble organic solvent, for example, alcohol, such as methanol, ethanol, or propanol, or acetone, and subsequently, it is separated from the solvent by centrifugal dehydration, filtration, etc. and dried, and finally it may be isolated. As other methods, there may be mentioned methods wherein an organic solvent having some degree of water solubility, such as methyl ethyl ketone, is added to the emulsion including copolymer of the present invention to extract the copolymer in the emulsion into an organic solvent layer, and the organic solvent layer is separated and subsequently mixed with water to precipitate the copolymer component. Moreover, the emulsion may also be directly formed into fine particles by a spray drying process.

When a powder resin is used as a matrix resin in obtaining a resin composition by blending, the copolymer of the present invention is preferably collected as a powder having a weight average particle diameter of preferably not less than 1 μm, more preferably not less than 10 μm, still more preferably not less than 50 μm, and furthermore preferably not more than 1 mm, more preferably not more than 500 μm. Especially a powder resin having a weight average particle diameter similar to or equal to a weight average particle diameter of the matrix resin powder advantageously prevents classification. In order to facilitate dispersion of primary particles of the graft copolymer in the matrix resin, the powder is preferably in a state where the graft copolymer of the present invention is loosely aggregated.

The copolymer of the present invention may be blended with a matrix resin, such as thermoplastic resin, thermosetting resin, and elastomer to give a resin composition. The copolymer of the present invention may preferably be used as a flame retardant for the matrix resin. The resin composition may be used as a flame retardant resin composition that can give advanced flame retardancy and impact resistance to a finally obtained shaped article.

The amount of the copolymer of the present invention to the matrix resin is preferably not less than 0.1 part by weight, more preferably not less than 1 part by weight, and preferably not more than 20 parts by weight, more preferably not more than 10 parts by weight, still more preferably not more than 6 parts by weight, especially preferably not more than 4 parts by weight, per 100 parts of the matrix resin. Undesirably, an amount exceeding the above-mentioned range may make molding difficult, and an amount less than the range tends to fail to develop both of flame retardancy and impact resistance.

Examples of the matrix resins include, as thermoplastic resins, polycarbonate resins, polyester resins, such as polyethylene terephthalate resins, polybutylene terephthalate resins, poly (cyclohexylene-dimethylene) terephthalate resins, and polyethylene naphthalate resins, polyester carbonate resins, polyphenylene ether resins (preferably modified ones with polystyrene, etc.), polyphenylene sulfide resins, polyether sulfone resins, polysulfone resins, polyarylene resin, polyamide resins, polyether imide resins, polyacetal resins, polyvinyl acetal resins, polystyrene resins, polyacrylonitrile resins, acrylonitrile-styrene copolymer resins, butadiene-styrene copolymer (HIPS) resins, acrylonitrile-butadiene rubber-styrene copolymer (ABS) resins, acrylonitrile-butadiene rubber-α-methyl styrene copolymer resins, styrene-butadiene rubber-acrylonitrile-N-phenylmaleimide copolymer resins, acrylonitrile-acrylic rubber-styrene copolymer (AAS) resins, polyolefin resins, such as polyethylenes, polypropylenes, polymethylpentenes, and polybutenes. And furthermore, examples include, as thermosetting resins, epoxy resins, phenol resins, urea resins, melamine resins, polyimide resins, unsaturated polyester resins; as elastomers, acrylic rubbers, such as butyl acrylate based rubbers, nitrile rubbers, such as butadiene-acrylonitrile based copolymers, polychloroprene rubbers, natural rubbers, butadiene rubbers, styrene-butadiene rubbers, methyl methacrylate-butyl acrylate block copolymers, styrene-isobutylene block copolymers, styrene-butadiene block copolymers, hydrogenated styrene-butadiene block copolymers, polyester elastomers. These may be used alone or two or more may be used in combination.

Of the above-mentioned resins, especially preferably use of polycarbonate based resin can easily develop flame retardancy. The expression "polycarbonate based resin" has a meaning that it contains not less than 50% by weight of polycarbonate resin to a total amount of polycarbonate resin and other resins. The polycarbonate based resin more preferably contains not less than 70% by weight of polycarbonate resin. Most preferably the polycarbonate based resin contains polycarbonate resin substantially alone.

The expression "the polycarbonate based resin contains polycarbonate resin substantially alone" means that the polycarbonate based resin contains not less than 95% by weight of polycarbonate. The ratio of polycarbonate resin in the above-mentioned percentage may give well-balanced excellent flame retardancy and impact resistance, and the higher the ratio of the polycarbonate resin is, the more satisfactory the effect is. As the polycarbonate based resins, there may also be used copolymers, such as polyamide-polycarbonate resins, polyester-polycarbonate resins, polycarbonate-polydimethylsiloxane copolymer resins, etc., and in this case, the percentage of the polycarbonate unit in whole resin is set to the same range as mentioned above. As other resins to be included in the polycarbonate based resins, resins other than the polycarbonate resins mentioned as examples of the above-mentioned thermoplastic resins may be used.

Polycarbonate resins to be used for the present invention may be obtained by making dihydric phenol react with phosgene or carbonate precursor. As dihydric phenols, bis(hydroxyaryl)alkanes are preferable, and examples include: bis (hydroxyphenyl)methane, 1,1-bis(4-hydroxyphenyl) ethane, 1,2-bis(4-hydroxyphenyl)ethane, 2,2-bis(hydroxyphenyl) propane, 2,2-bis(4-hydroxy-3,5-dibromophenyl) propane, 2,2-bis(4-hydroxy-3,5-dichlorophenyl) propane, and 2,2-bis (hydroxyphenyl)hexafluoropropane.

Other dihydric phenols include: bis(hydroxyphenyl)alkanes including phenyl groups, such as phenyl-bis(hydroxyphenyl)methane, diphenyl-bis(hydroxyphenyl)methane, and 1-phenyl-1,1-bis(4-hydroxyphenyl)ethane; bis(4-hydroxyphenyl)cycloalkanes, such as 1,1-bis(4-hydroxyphenyl)cyclohexane, 1,1-bis(4-hydroxyphenyl)-3,3,5-trimethylcyclohexane, and 1,1-bis(4-hydroxyphenyl) cyclodecane; 4,4'-dihydroxydiphenyl, bis(4-hydroxyphenyl)oxide, bis(4-hydroxyphenyl) sulfide, bis(4-hydroxyphenyl)sulfone, bis(4-hydroxyphenyl)sulfoxide, bis(4-hydroxyphenyl)ketone, hydroquinone, bisphenol fluorene, bisphenoxy ethanol fluorene, etc. These dihydric phenols may be used alone, or two or more kinds may be used in combination.

Dihydric phenols especially preferably to be used are bis (hydroxyphenyl)methane and 2,2-bis(hydroxyphenyl)propane. As carbonate precursors, diaryl carbonates, such as diphenyl carbonate; and dialkyl carbonates, such as dimethyl carbonate and diethyl carbonate may be mentioned. Besides these aromatic polycarbonate resins, aliphatic polycarbonate resins like polyethylene carbonate may also be used.

In these polycarbonate resins, dimethylsiloxanes may be copolymerized in a main chain thereof.

In the present invention, either of a single component system and a multi component system may be adopted as the matrix resin.

In mixing of the copolymer of the present invention with the matrix resins, such as thermoplastic resins, thermosetting resins, and elastomers, after mixing using a Henschel mixer, a ribbon blender, etc., the resultant may be melt-kneaded using rolls, an extruder, a kneader, etc.

In this mixing process, there may be blended usually used, publicly known additives, including: antioxidants, such as phenolic antioxidants, phosphorus based antioxidants, and sulfur based antioxidants; anti-dripping agents; polymer processing aids, such as high molecular weight poly(methyl methacrylate) based resins; flame retardants, such as silicone resins, red phosphorus, and (condensed) phosphates; impact modifiers such as butadiene-methyl methacrylate-styrene copolymers, or graft-copolymers obtained by graft-copolymerizing methyl methacrylate, styrene, acrylonitrile, etc. onto alkyl (meth)acrylate rubber or composite rubber comprising alkyl (meth)acrylate rubber and polyorganosiloxanes; melt-flow improving agents, such as terpene resins and acrylonitrile-styrene copolymers; plasticizers; lubricants; ultraviolet absorbers; pigments; fiber reinforcing agents, such as glass fibers; fillers, such as talc, mica, calcium carbonate, oxides of titanium, zinc oxide nano-particles, layer silicate, metallic micro-particles, and carbon nanotubes; polymer lubricants; polyorganosiloxanes including functional groups, such as polyorganosiloxane including epoxy groups; compatibilizers, such as (epoxy-modified) styrene-butadiene-styrene block copolymers; antistatic agents, such as polyamide-polyether block polymers, alkylene glycols, glycerol, and fatty acid esters; mold release agents, such as monoglycerides, silicone oils, and polyglycerols; coupling agents used for fillers and matrix resins, such as silane coupling agents and titanium coupling agents.

Especially for an anti-dripping agent in combustion tests, such as UL-94 test, fluororesins, such as polytetrafluoroethylenes and polyvinylidene fluorides, powdery materials obtained by compounding polytetrafluoroethylene with other polymers, such as (meth)acrylic acid ester based polymer may be used. The amount thereof is preferably in a range not more than 2 parts by weight, more preferably not more than 1 part by weight, and still more preferably not more than 0.6 parts by weight, per 100 parts by weight of matrix resin, and preferably in a range of not less than 0.1 part by weight, per 100 parts by weight of matrix resin, and thereby preventive effect may desirably be obtained when the problem of dripping occurs.

When the resin composition is obtained from a copolymer of the present invention and a thermoplastic resin, molding methods used for molding of usual thermoplastic resin compositions, that is, an injection molding method, an extrusion method, a blow molding method, a calender molding method, etc. may be applicable, as molding methods of a flame resistant resin composition of the present invention. When the resin composition is obtained from the copolymer of the present invention and a thermosetting resin, there may be used a method wherein the composition is hardened with heating, etc. after introduction of the flame resistant resin composition of the present invention into a mold, etc. When the resin composition is obtained from the copolymer of the present invention and an elastomer, for example, it is molded into a shape compatible for the purpose of molding using molding methods, such as injection molding and heat pressing molding, and then it is, if necessary, cured to provide a molded product.

Use of molded products obtained from the flame resistant resin composition of the present invention is not particularly limited, and, many uses that need impact resistance, flame retardancy, cold resistance, etc. may be mentioned, for example: office appliances and home electric appliances, such as desktop computers, notebook type computers, liquid crystal displays, plasma displays, PDAs, printers, copying machines, fax machines, (portable) telephones, (portable) audio instruments, lighting instruments, game machines, digital video cameras, digital cameras, video recorders, hard-disk video recorders, DVD recorders, clocks, etc.; battery for cars, etc.; parts of capacitors; electronic and electrical machinery parts, such as LED graphic display devices, display materials within power supply box, telephone jacks, terminal block covers, and coil bobbins; electronic and electrical materials, such as sealing compound; and automobile members, such as seal materials, vibration isolation materials of glass, heater fans, steering wheels, and vibration-proof materials, etc.

Obtained molded products can exhibit outstanding (low temperature) impact resistance and flame retardancy.

EXAMPLES

Although detailed descriptions of the present invention will, hereinafter, be given based on Examples, the present invention is not limited to them. A term "part" as used herein represents "part by weight". Following measurements and experiments in Examples and Comparative Examples were performed as follows.

[Polymerization Conversion]

A part of the obtained latex was sampled and precisely weighed, and dried in a hot-air dryer at 130° C. for 1 hour. The resultant solid was precisely weighed, and the solid component ratio in latex was obtained. The polymerization conversion was calculated by using the following expression.

{[(raw material gross weight used×solid component ratio)−raw material gross weight other than a monomer (auxiliary material)]/monomer weight used}×100(%)

Here, a chain transfer agent was dealt with as a used monomer.

[Volume Average Particle Diameter]

The volume average particle diameter of a seed polymer, polyorganosiloxane particle, and a graft copolymer was measured in a state of latex. A measuring apparatus, MICROTRAC UPA 150 made by Nikkiso Co., Ltd. was used for measuring the volume average particle diameter (μm).

[Impact Resistance]

According to ASTM D-256, evaluation was performed by Izod test at 0° C. using ⅛-inch bar with notch.

[Flame Retardancy]

The flame retardancy was evaluated by UL94 V test.

Manufacturing Example 1

Manufacture of Polybutyl Acrylate Based Seed Polymer (SD-1)

Into a five-necked flask having an agitator, a reflux condenser, a nitrogen introducing inlet, a monomer introducing inlet, and a thermometer, were introduced and mixed 400 parts by weight of water and 12 parts (solid) of 15% sodium dodecylbenzenesulfonate aqueous solution (manufactured by Kao Corp., Neopelex G15). Subsequently the system was raised up to 50° C. and after the temperature of the liquid reached 50° C., the system was substituted by nitrogen. Then, 10 parts by weight of butyl acrylate and 3 parts by weight of t-dodecyl mercaptan were added. After 30 minutes, 0.01 part by weight (solid content) of paramenthane hydroperoxide, 0.3 part by weight of sodium formaldehyde sulfoxylate (SFS), 0.01 part by weight of disodium ethylenediaminetetraacetate (EDTA), 0.0025 part by weight of ferrous sulfate ($FeSO_4.7H_2O$) were added, and then the system was agitated for 1 hour. A mixed liquor composed of 90 parts by weight of butyl acrylate, 27 parts by weight of t-dodecyl mercaptan, and 0.09 part by weight (solid) of paramenthane hydroperoxide was added continuously over 3 hours. Subsequently, post-polymerization for 2 hours was performed to obtain a latex including seed polymer (SD-1) having a volume average particle diameter of 0.03 μm at a polymerization conversion of 90% (t-dodecyl mercaptan was regarded as a raw material component).

Manufacturing Examples 2 and 3

Manufacture of Polyorganosiloxane Particle (S-1 and S-2)

Using composition shown in Table 1, agitation for 5 minutes at 7,500 rpm by a homo mixer was given to prepare siloxane emulsion. Separately, a seed polymer (SD-1) latex equivalent to solid content of amount shown in Table 1 was introduced into a five-necked flask provided with an agitator, a reflux condenser, a nitrogen introducing inlet, an inlet for monomer addition, and a thermometer. The above-mentioned siloxane emulsion was poured into the flask at once. The system was raised from 35° C. to 80° C. over 1 hour, while agitating under nitrogen flow, and then, 1 part by weight (solid) of 10% dodecylbenzenesulfonic acid (DBSA, manufactured by Kao Corp., Neopelex GS) aqueous solution was added. Reaction was continued for 15 hours, the system was then cooled to 25° C. After the system was kept standing for 20 hours, pH was adjusted to 6.5 using sodium hydrogen carbonate 3% aqueous solution to terminate polymerization. A latex including polyorganosiloxane particles (S-1 and S-2) was obtained. Table 1 shows test results of polymerization conversion, and volume average particle diameters of latices of polyorganosiloxane particles.

TABLE 1

| | | | Manufacturing Example | | |
|---|---|---|---|---|---|
| | | | 2 | 3 | 4 |
| Polyorganosiloxane particles | | | S-1 | S-2 | S-3 |
| Seed polymer | SD-1 | Part | 2 | 2 | — |
| Siloxane Emulsion | Ion exchanged water | Part | 280 | 280 | 200 |
| | SDBS | Part | 0.5 | 0.5 | 1 |
| | DBSA | Part | — | — | 1 |
| | D4 | Part | 93 | 93 | — |
| | DHPDMS | Part | — | — | 97.5 |
| | DSMA | Part | 5 | — | 2.5 |
| | MPrDMS | Part | — | 5 | — |
| Polymerization Catalyst | DBSA | Part | 1 | 1 | — |
| Polymerization conversion | | | 86% | 86% | 96% |
| Volume average particle diameter | | μm | 0.23 | 0.24 | 0.28 |

SDBS: sodium dodecylbenzenesulfonate
DBSA: dodecylbenzenesulfonic acid
D4: octamethylcyclotetrasiloxane
DHPDMS: dihydroxy-terminated polydimethylsiloxane with an average molecular weight of 2,000
DSMA: γ-methacryloyloxypropylmethyldimethoxysilane
MPrDMS: mercaptopropyldimethoxymethylsilane Manufacturing Example 4

Manufacture of Polyorganosiloxane Particle (S-3)

A composition shown in Table 1 was used and after agitation for 5 minutes at 10,000 rpm by a homomixer, the system was passed through a high pressure homogenizer 3 times under pressure of 500 bar to prepare a siloxane emulsion. This emulsion was promptly poured into a five-necked flask provided with a reflux condenser, a nitrogen introducing inlet, a monomer addition inlet, and a thermometer, and reaction was carried out at 30° C. for 6 hours with agitation. Subsequently, the system was cooled to 23° C. and kept standing for 20 hours, and then a pH of the system was adjusted to 6.8 by sodium hydrogen carbonate to terminate polymerization, and finally a latex including polyorganosiloxane particles (S-3) was obtained. Table 1 shows test results of a polymerization conversion, and a volume average particle diameter of the latex of polyorganosiloxane particles.

According to "Polymer Handbook", 1999, 4th edition by John Wiley & Sons, a glass transition temperature of polydimethylsiloxane (synonym: polyoxydimethylsilylene) that is a main constituent of the polyorganosiloxane particles (S-1 to S-3) is approximately −127° C.

Examples 1 to 5

Polyorganosiloxane Based Graft Copolymers (SG-1 to SG-5)

Into a five-necked flask provided with an agitator, a reflux condenser, a nitrogen introducing inlet, a monomer addition inlet, and a thermometer, were introduced 240 parts by weight (including the water accompanied with the latex including organosiloxane particles) of ion exchanged water, and latex of polyorganosiloxane particles (S-1 to S-3) obtained in Manufacturing Examples 2 to 4 in amounts in Table 2 (Table 2 shows the amounts corresponding to solid content). In each case, the system was raised to temperature shown in Table 2 under nitrogen current with agitation.

0.5 part by weight of sodium formaldehyde sulfoxylate (SFS), 0.005 part by weight of disodium ethylenediaminetetraacetate (EDTA), and 0.001 part by weight of ferrous sulfate were added 1 hour after the system reached temperature shown in Table 2, and then a mixture (MG-1) of graft monomer having a composition shown in Table 2 was added at once, and agitation was continued for 1 hour. Subsequently, a mixture of the graft monomer (MG-2) having a composition shown in Table 2 was added dropwise over 1 hour, and after addition, agitation was continued for 2 more hours to obtain latex of polyorganosiloxane based graft copolymers (SG-1 to SG-5). Table 2 shows test results of polymerization conversion of all graft parts, and volume average particle diameters of the latices.

Ion exchanged water was added to the obtained latex to obtain a latex having 15% of solid concentration, and then 4 parts (solid) of 2.5% calcium chloride aqueous solution was added to the latex to obtain a coagulated slurry. Furthermore water was added to give a slurry having 12% of solid concentration. The obtained coagulated slurry was heated up to 95° C., and then after the coagulated slurry was kept at 95° C. for 2 minutes, it was cooled to 50° C. and dehydrated. The coagulated slurry was washed with water whose amount was 5 times as much as the amount of the resin, and dried to obtain a powder of polyorganosiloxane based graft copolymer.

TABLE 2

|  |  |  | Example | | | | |
|---|---|---|---|---|---|---|---|
|  |  |  | 1 | 2 | 3 | 4 | 5 |
| Graft copolymer including polyorganosiloxane |  |  | SG-1 | SG-2 | SG-3 | SG-4 | SG-5 |
| Polyorganosiloxane particles | S-1 | Part | 80 | — | — | — | — |
|  | S-2 | Part | — | 70 | 70 | 70 | — |
|  | S-3 | Part | — | — | — | — | 80 |
| Polymerization temperature |  | °C. | 60 | 60 | 60 | 60 | 60 |
| Graft monomer: first step (MG-1) | DVBP | Part | 1.5 | 1.5 | 3 | 1.5 | 1.5 |
|  | AIMA | Part | — | — | — | 1.5 | — |
|  | CHP | Part | 0.15 | 0.15 | 0.3 | 0.3 | 0.15 |
| Graft monomer: second step (MG-2) | MMA | Part | 18.5 | 28.5 | 27 | 27 | 18.5 |
|  | CHP | Part | 0.14 | 0.21 | 0.21 | 0.21 | 0.14 |
| Polymerization conversion (only graft components) |  |  | 99% | 100% | 100% | 98% | 100% |
| Volume average particle diameter |  | μm | 0.25 | 0.27 | 0.27 | 0.27 | 0.30 |

|  |  |  | Comparative Example | | | |
|---|---|---|---|---|---|---|
|  |  |  | 1 | 2 | 3 | 4 |
| Graft copolymer including polyorganosiloxane |  |  | SG'-1 | SG'-2 | SG'-3 | SG'-4 |
| Polyorganosiloxane particles | S-1 | Part | 80 | — | — | — |
|  | S-2 | Part | — | 70 | 70 | — |
|  | S-3 | Part | — | — | — | 80 |
| Polymerization temperature |  | °C. | 60 | 60 | 60 | 60 |
| Graft monomer: first step (MG-1) | DVBP | Part | — | — | — | — |
|  | AIMA | Part | 1.5 | 1.5 | 3 | 1.5 |
|  | CHP | Part | 0.15 | 0.15 | 0.3 | 0.15 |
| Graft monomer: second step (MG-2) | MMA | Part | 18.5 | 28.5 | 27 | 18.5 |
|  | CHP | Part | 0.14 | 0.21 | 0.21 | 0.14 |
| Polymerization conversion (only graft components) |  |  | 98% | 99% | 97% | 99% |
| Volume average particle diameter |  | μm | 0.25 | 0.27 | 0.27 | 0.30 |

DVBP: 3,3'-divinylbiphenyl
AIMA: allyl methacrylate
MMA: methyl methacrylate
CHP: cumene hydroperoxide Comparative Examples 1 to 4

Polyorganosiloxane Based Graft Copolymers (SG'-1 to SG'-4)

Polyorganosiloxane based graft copolymers (SG'-1 to SG'-4) were obtained in a same manner as in Examples 1, 2, and 5. Table 2 shows results of polymerization conversion of all graft parts analyzed in a state of latices, and volume average particle diameters of the latices.

Examples 6 to 10 and Comparative Examples 5 to 9

Imparting Flame Retardancy to a Polycarbonate Resin 0 or 3 parts by weight of powder of polyorganosiloxane based graft copolymer (SG-1 to SG-5, and SG'-1 to SG'-4) obtained in Examples 1 to 5 and Comparative Examples 1 to 4, and 0.4 part by weight of polytetrafluoroethylene (manufactured by Daikin Industries, LTD. trade name: PolyFron FA-500) were blended to 100 parts by weight of a polycarbonate resin (manufactured by Teijin Chemicals, Inc., trade name: Panlight L1225WX). The obtained compound was melt-kneaded at 270° C. using a twin screw extruder (made by Japan Steel Works Make, TEX 44SS) to obtain pellets. Using a FAS 100B injection molding machine made by FANUC, LTD. with a cylinder temperature of 280° C., specimens with a dimension of 1/20 inches for flame retardancy evaluation and specimens with a dimension of 1/84 inch for impact resistance evaluation were produced from the obtained pellet. Evaluation was conducted for the obtained specimens according to the above described evaluation methods. Table 3 collectively shows results of the impact resistance and flame retardancy of molded articles.

TABLE 3

|  |  |  |  | Example | | | | |
|---|---|---|---|---|---|---|---|---|
|  |  |  |  | 6 | 7 | 8 | 9 | 10 |
| Polycarbonate |  |  | Part | 100 | 100 | 100 | 100 | 100 |
| Graft copolymer composition including organopolysiloxane |  |  | Part | SG-1 3 | SG-2 3 | SG-3 3 | SG-4 3 | SG-5 3 |
| PTFE |  |  | Part | 0.4 | 0.4 | 0.4 | 0.4 | 0.4 |
| Physical properties (1/20 inch) | Flame retardancy | Total flaming Time | Second | 37 | 43 | 69 | 74 | 48 |
|  |  | Drip | Time | not observed | not observed | not observed | not observed | not observed |

TABLE 3-continued

|  |  |  |  |  |  |  |  |
|---|---|---|---|---|---|---|---|
| Impact resistance (Izod strength) | ¼ inch, 0° C. | kJ/m² | 27 | 26 | 25 | 25 | 28 |

|  |  |  | Comparative Example | | | | |
|---|---|---|---|---|---|---|---|
|  |  |  | 5 | 6 | 7 | 8 | 9 |
| Polycarbonate |  | Part | 100 | 100 | 100 | 100 | 100 |
| Graft copolymer composition including Polyorganosiloxane |  | Part | SG'-1 3 | SG'-2 3 | SG'-3 3 | SG'-4 3 | — 0 |
| PTFE |  | Part | 0.4 | 0.4 | 0.4 | 0.4 | 0.4 |
| Physical properties | Flame retardancy (1/20 inch) Total flaming Time | Second | 124 | 135 | 114 | 144 | 193 |
|  | Drip | Time | not observed | not observed | not observed | not observed | observed |
|  | Impact resistance (Izod strength) ¼ inch, 0° C. | kJ/m² | 27 | 26 | 24 | 27 | 11 |

Examples 11 to 14 and Comparative Examples 10 to 13

Imparting Flame Retardancy to Polycarbonate Resin Based Polymer Alloy 0 or 5 parts by weight of particles of polyorganosiloxane based graft copolymer (SG-5) obtained in Example 5, 0.5 part by weight of polytetrafluoroethylene (manufactured by Daikin Industries, LTD., trade name: Poly Flon FA-500), 0 or 4 parts by weight of talc (manufactured by Japan Talc Incorporated, trade name: SG-2000), 0.2 part by weight of a phenolic antioxidant (manufactured by Asahi Denka Co., Ltd., trade name: AO-60), and 0.2 part by weight of a phosphorus based antioxidant (manufactured by Asahi Denka Co., Ltd., trade name: HP-10) were blended into the following resins. That is: 80 parts by weight of a polycarbonate resin (manufactured by Idemitsu Kosan Inc., trade name: Tuflon A2200), and any one of 20 parts by weight of an ABS resin (manufactured by Japan A & L, Inc., trade name: Sunac AT-08), 20 parts by weight of an AS resin (manufactured by Toyo Styrene Incorporated Company, trade name: Toyo styrol AS-41), 20 parts by weight of a polystyrene resin (manufactured by Toyo Styrene Incorporated Company, trade name: Toyo styrol G-13 (HRM13N)), and 20 parts by weight of a polyethylene terephthalate resin (recycled resin, manufactured by KANEKA CORPORATION, in-company product).

The obtained compound was melt-kneaded at 260° C. using a twin screw extruder (made by Japan Steel Works, Ltd., TEX 44SS) to produce pellets. Using a FAS 100B injection molding machine made by FANUC, LTD. with a cylinder temperature of 290° C., specimens with a dimension of 1/12 inch for flame retardancy evaluation and specimens with a dimension of 1/8 inch for impact resistance evaluation were produced from the obtained pellets. Evaluation was conducted for the obtained specimens according to the above described valuation methods. Table 4 shows results of the impact resistance and flame retardancy of molded articles.

TABLE 4

|  |  |  |  | Example | | | |
|---|---|---|---|---|---|---|---|
|  |  |  |  | 11 | 12 | 13 | 14 |
| Polycarbonate |  |  | Part | 80 | 80 | 80 | 80 |
| Acrylonitrile-butadiene-styrene resin |  |  | Part | 20 | — | — | — |
| Styrene-acrylonitrile resin |  |  | Part | — | 20 | — | — |
| Polystyrene |  |  | Part | — | — | 20 | — |
| Polyethylene terephthalate |  |  | Part | — | — | — | 20 |
| Graft copolymer composition including organopolysiloxane |  |  | Part | SG-5 5 | SG-5 5 | SG-5 5 | SG-5 5 |
| PTFE |  |  | Part | 0.5 | 0.5 | 0.5 | 0.5 |
| Antioxidant | AO-60 |  | Part | 0.2 | 0.2 | 0.2 | 0.2 |
|  | HP-10 |  | Part | 0.2 | 0.2 | 0.2 | 0.2 |
| Filler |  |  | Kind | Talc | Talc | — | — |
|  |  |  | Part | 4 | 4 | — | — |
| Physical properties | Flame retardancy (1/12 inch) | Total flaming Time | Second | 241 | 158 | 177 | 153 |
|  |  | Drip | Time | Not observed | Not observed | Not observed | Not observed |
|  | Impact resistance (Izod strength) | ⅛ inch, −10° C. | kJ/m² | 68 | 40 | 36 | 51 |

|  |  |  |  | Comparative Example | | | |
|---|---|---|---|---|---|---|---|
|  |  |  |  | 10 | 11 | 12 | 13 |
| Polycarbonate |  |  | Part | 80 | 80 | 80 | 80 |
| Acrylonitrile-butadiene-styrene resin |  |  | Part | 20 | — | — | — |
| Styrene-acrylonitrile resin |  |  | Part | — | 20 | — | — |
| Polystyrene |  |  | Part | — | — | 20 | — |

TABLE 4-continued

| | | | | | | | |
|---|---|---|---|---|---|---|---|
| Polyethylene terephthalate | | | Part | — | — | — | 20 |
| Graft copolymer composition including organopolysiloxane | | | Part | — | — | — | — |
| PTFE | | | Part | 0.5 | 0.5 | 0.5 | 0.5 |
| Filler | | | Kind | Talc | Talc | — | — |
| | | | Part | 4 | 4 | — | 15 |
| Antioxidant | AO-60 | | Part | 0.2 | 0.2 | 0.2 | 0.2 |
| | HP-10 | | Part | 0.2 | 0.2 | 0.2 | 0.2 |
| Physical properties | Flame retardancy (1/12 inch) | Total flaming Time | Second | 302 | 291 | 206 | 163 |
| | | Drip | Time | observed | observed | observed | observed |
| | Impact resistance (Izod strength) | 1/8 inch, −10° C. | kJ/m² | 18 | 14 | 11 | 9 |

Tables 3 and 4 show clearly that copolymers in Examples give both of more excellent flame retardancy and impact resistance as compared with those in Comparative Examples.

The invention claimed is:

1. A graft copolymer comprising
  a polymer (A) segment having a glass transition temperature not more than −10° C.,
  a polymer (C) segment obtained by polymerizing a monomer including monomer (B) with two or more aromatic rings and two or more vinyl groups in one molecule, and
  a polymer grafted to the polymer (C) obtained by polymerizing an ethylenically unsaturated monomer (E),
  wherein the polymer (C) is grafted to the polymer (A).

2. The graft copolymer according to claim 1, wherein the polymer (A) is a polyorganosiloxane (D).

3. The graft copolymer according to claim 1, wherein the monomer (B) has at least two aromatic rings being not in a condensed relationship and being directly bonded together.

4. A particulate comprising the graft copolymer according to claim 1.

5. A flame retardant comprising the graft copolymer according to claim 1.

6. A resin composition comprising the flame retardant according to claim 5.

7. A flame retardant comprising the particulate copolymer according to claim 4.

8. A resin composition comprising the flame retardant according to claim 7.

* * * * *